US012794552B2

(12) United States Patent
Archambault et al.

(10) Patent No.: US 12,794,552 B2
(45) Date of Patent: Nov. 10, 2026

(54) BIDIRECTIONAL OPTICAL TIME DOMAIN REFLECTOMETER USING A SINGLE WAVELENGTH

(71) Applicant: Ciena Corporation, Hanover, MD (US)

(72) Inventors: Jean-Luc Archambault, Ottawa (CA); Xuesong Deng, Ottawa (CA); Song Cao, Ottawa (CA); Kevan Peter Jones, Ottawa (CA)

(73) Assignee: Ciena Corporation, Fulton, MD (US)

( * ) Notice: Subject to any disclaimer, the term of this patent is extended or adjusted under 35 U.S.C. 154(b) by 353 days.

(21) Appl. No.: 18/515,862

(22) Filed: Nov. 21, 2023

(65) Prior Publication Data

US 2025/0167884 A1 May 22, 2025

(51) Int. Cl.

*H04B 10/071* (2013.01)
*G01M 11/00* (2006.01)
*H04B 10/25* (2013.01)
*H04J 14/02* (2006.01)

(52) U.S. Cl.

CPC ....... *H04B 10/071* (2013.01); *G01M 11/3118* (2013.01); *G01M 11/3145* (2013.01); *G01M 11/3154* (2013.01); *H04B 10/2589* (2020.05); *H04J 14/021* (2013.01)

(58) Field of Classification Search

None

See application file for complete search history.

(56) References Cited

U.S. PATENT DOCUMENTS 4,973,169 A 11/1990 Slonecker
6,519,026 B1 2/2003 Holland
6,519,082 B2 2/2003 Ghera et al.
6,624,927 B1 9/2003 Wong et al.
7,042,559 B1 5/2006 Frigo et al.
7,088,436 B2 8/2006 Saunders et al.
7,336,898 B2 2/2008 Fling et al.
7,388,657 B2 6/2008 Abott
7,872,738 B2 1/2011 Abbott
8,477,411 B2 7/2013 Griseri et al.

(Continued)

OTHER PUBLICATIONS

Pilhan Kim, Jaehyoung Park, Hosung Yoon, Jonghan Park, and Namkyoo Park; "In Situ Design Method for Multichannel Gain of a Distributed Raman Amplifier With Multiwave OTDR"; IEEE Photonics Technology Letters, vol. 14, No. 12, Dec. 2002—(C) 2002 IEEE.

(Continued)

*Primary Examiner* — Kara E. Geisel
*Assistant Examiner* — Chad Andrew Reverman
(74) *Attorney, Agent, or Firm* — Baratta Law PLLC; Lawrence A. Baratta, Jr.

(57) ABSTRACT

An Optical Time Domain Reflectometer (OTDR) includes a transmitter configured to transmit first OTDR pulses, at a first pulse period and at a wavelength λ, over a fiber under test; a receiver configured to receive signals from the fiber under test; and circuitry configured to set the first pulse period and to average measurements resulting from the received signals, wherein the OTDR is configured to operate with a second OTDR at another end of the fiber under test for a bidirectional OTDR measurement, wherein the second OTDR uses the same wavelength λ and transmits second OTDR pulses at a second pulse period, different from the first pulse period.

20 Claims, 8 Drawing Sheets

(56) References Cited

U.S. PATENT DOCUMENTS

| | | | |
|---|---|---|---|
| 8,564,876 B2 | 10/2013 | Hiraizumi et al. | |
| 2002/0118442 A1 | 8/2002 | Ghera et al. | |
| 2002/0159134 A1 | 10/2002 | Ghera et al. | |
| 2004/0150875 A1 | 8/2004 | Fishman et al. | |
| 2005/0105167 A1 | 5/2005 | Martinielli et al. | |
| 2005/0174563 A1 | 8/2005 | Evans et al. | |
| 2006/0024063 A1 | 2/2006 | Onaka et al. | |
| 2007/0025676 A1 | 2/2007 | Russell | |
| 2007/0041006 A1 | 2/2007 | Abbott | |
| 2009/0207482 A1 | 8/2009 | Izumi | |
| 2010/0119225 A1 | 5/2010 | Snawerdt | |
| 2010/0128756 A1 | 5/2010 | Lee et al. | |
| 2011/0255860 A1 | 10/2011 | Lee et al. | |
| 2012/0020672 A1 | 1/2012 | Aguren | |
| 2013/0272694 A1 | 10/2013 | Sandstrom | |
| 2014/0072306 A1 | 3/2014 | Sridhar et al. | |
| 2014/0077971 A1 | 3/2014 | Archambault et al. | |
| 2015/0208146 A1 | 7/2015 | Younce et al. | |
| 2015/0253217 A1 | 9/2015 | Gurusami et al. | |
| 2015/0381274 A1 | 12/2015 | Archambault et al. | |
| 2016/0277101 A1* | 9/2016 | Jiang | G01M 11/00 |
| 2018/0017464 A1* | 1/2018 | Na | H04B 10/071 |
| 2020/0072703 A1* | 3/2020 | Roux | G01M 11/3145 |
| 2022/0069934 A1* | 3/2022 | Jiang | H04B 10/077 |

OTHER PUBLICATIONS

D. Meshulach, O. Eyal, and R. Klein; "In-Situ time-gated method for fiber characterization and performance prediction of distributed Raman amplification"; (C) 2002—Optical Society of America.

"Optical Networks Having Optical Time Domain Reflectometers Embedded in Small Form Factor Pluggables," Lanier Ford Docket No. 09-0247.8410.

* cited by examiner

BIDIRECTIONAL OPTICAL TIME DOMAIN REFLECTOMETER USING A SINGLE WAVELENGTH

FIELD OF THE DISCLOSURE

The present disclosure relates generally to networking and computing. More particularly, the present disclosure relates to systems and methods for a bidirectional Optical Time Domain Reflectometer (OTDR) using a single wavelength.

BACKGROUND OF THE DISCLOSURE

OTDRs inject a series of optical pulses into a fiber under test and extract, from the same end of the fiber, light that is scattered (i.e., Rayleigh backscatter) or reflected back from points along the fiber. Results from OTDRs are used for estimating the fiber's length, overall attenuation, discontinuities along the fiber, and the like. As described herein, a bidirectional OTDR is one where the fiber under test is being analyzed from both directions. There are approaches to integrate OTDRs in optical network elements (e.g., Wavelength Division Multiplexed (WDM) systems) which operate while the fiber has working traffic, i.e., an embedded or integrated OTDR, such as described in commonly-assigned U.S. Pat. No. 10,277,311, issued on Apr. 30, 2019, and entitled "DUAL WAVELENGTH OPTICAL TIME DOMAIN REFLECTOMETER SYSTEMS AND METHODS EMBEDDED IN A WDM SYSTEM," the contents of which are incorporated by reference. An embedded OTDR allows a network operator to monitor the health of fiber plant in real-time as well as provide additional advanced applications.

BRIEF SUMMARY OF THE DISCLOSURE

The present disclosure relates to systems and methods for a bidirectional OTDR using a single wavelength. The bidirectional OTDR is embedded or integrated into an optical networking system, i.e., at an optical network element, WDM terminal, Reconfigurable Optical Add/Drop Multiplexer (ROADM), in-line amplifier, etc., and the objective is to use the bidirectional OTDR in-service meaning while there is traffic on traffic-carrying wavelengths over a fiber under test. The bidirectional OTDR described herein uses a single wavelength and can operate from both directions at the same time, in-service with the traffic-carrying wavelengths on the same fiber under test, be free of false events result due to OTDR pulse collisions. Specifically, the bidirectional OTDR supports simultaneous operation, meaning both ends can perform an OTDR measurement at the same time using the same wavelength on the same fiber under test. This is performed by selecting OTDR pulse repetition rates to minimize any impact of interfering pulses in an averaged OTDR trace. That is, an OTDR measurement includes multiple tests using OTDR pulses and the multiple tests are averaged to provide accurate results, faster due to the simultaneous operation, and with less complex hardware.

In an embodiment, an Optical Time Domain Reflectometer (OTDR) includes a transmitter configured to transmit first OTDR pulses, at a first pulse period and at a wavelength λ, over a fiber under test; a receiver configured to receive signals from the fiber under test; and circuitry configured to set the first pulse period and to average measurements resulting from the received signals, wherein the OTDR is configured to operate with a second OTDR at another end of the fiber under test for a bidirectional OTDR measurement, wherein the second OTDR uses the same wavelength λ and transmits second OTDR pulses at a second pulse period, different from the first pulse period.

The OTDR can be one of integrated in a module in an optical network element and a pluggable module configured to operate in the optical network element, such that the OTDR is an embedded OTDR. The wavelength λ can be outside of a range of wavelengths used for traffic-carrying channels in an optical line system. The first pulse period and the second pulse period can be selected so that any interfering second OTDR pulses are spread across the first pulse period. The OTDR can further include a clock utilized by the transmitter for the first pulse period, wherein the clock is within a tolerance of a second clock at the second OTDR. The first pulse period can be selected without coordination with the second OTDR. The first pulse period cam be selected based on whether the transmitter is configured to transmit the first OTDR pulses co-propagating or counter-propagating with traffic-carrying wavelengths. The first pulse period and the second pulse period can be assigned based on a global assignment that ensures adjacent nodes have different pulse periods. The first pulse period and the second pulse period can be assigned based on connectivity to adjacent nodes. The first pulse period and the second pulse period can be assigned based on a pulse width of the first and second OTDR pulses and based on a distance of the bidirectional OTDR measurement.

In another embodiment, a bidirectional Optical Time Domain Reflectometer (OTDR) method includes transmitting OTDR pulses from each end of a fiber under test, at a same wavelength λ from both ends and with a first pulse period at one end and a second pulse period, different from the first pulse period, at the other end; receiving signals from the fiber under test at both ends; and averaging, at both ends, measurements resulting from the received signals at both ends.

The transmitting and the receiving can be performed by one of a module integrated in an optical network element and a pluggable module configured to operate in the optical network element, for an embedded OTDR. The wavelength 2 can be outside of a range of wavelengths used for traffic-carrying channels in an optical line system. The first pulse period and the second pulse period can be selected so that any interfering OTDR pulses are spread across the first pulse period. The method can include operating a clock at each end, wherein the clock at each end is within a tolerance of one another.

In a further embodiment, an apparatus includes circuitry configured to cause transmission of first Optical Time Domain Reflectometer (OTDR) pulses at a first pulse period and at a wavelength λ, over a fiber under test, and, responsive to received signals from the fiber under test, average measurements resulting from the received signals, wherein the first OTDR pulses are configured to operate with a second OTDR at another end of the fiber under test for a bidirectional OTDR measurement, wherein the second OTDR uses the same wavelength λ and transmits second OTDR pulses at a second pulse period, different from the first pulse period.

The circuitry can be one of integrated in a module in an optical network element and a pluggable module configured to operate in the optical network element, as an embedded OTDR. The wavelength λ can be outside of a range of wavelengths used for traffic-carrying channels in an optical line system. The first pulse period and the second pulse period can be selected so that any interfering second OTDR pulses are spread across the first pulse period. The apparatus can further include a clock utilized for the first pulse period, wherein the clock is within a tolerance of a second clock at the second OTDR.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
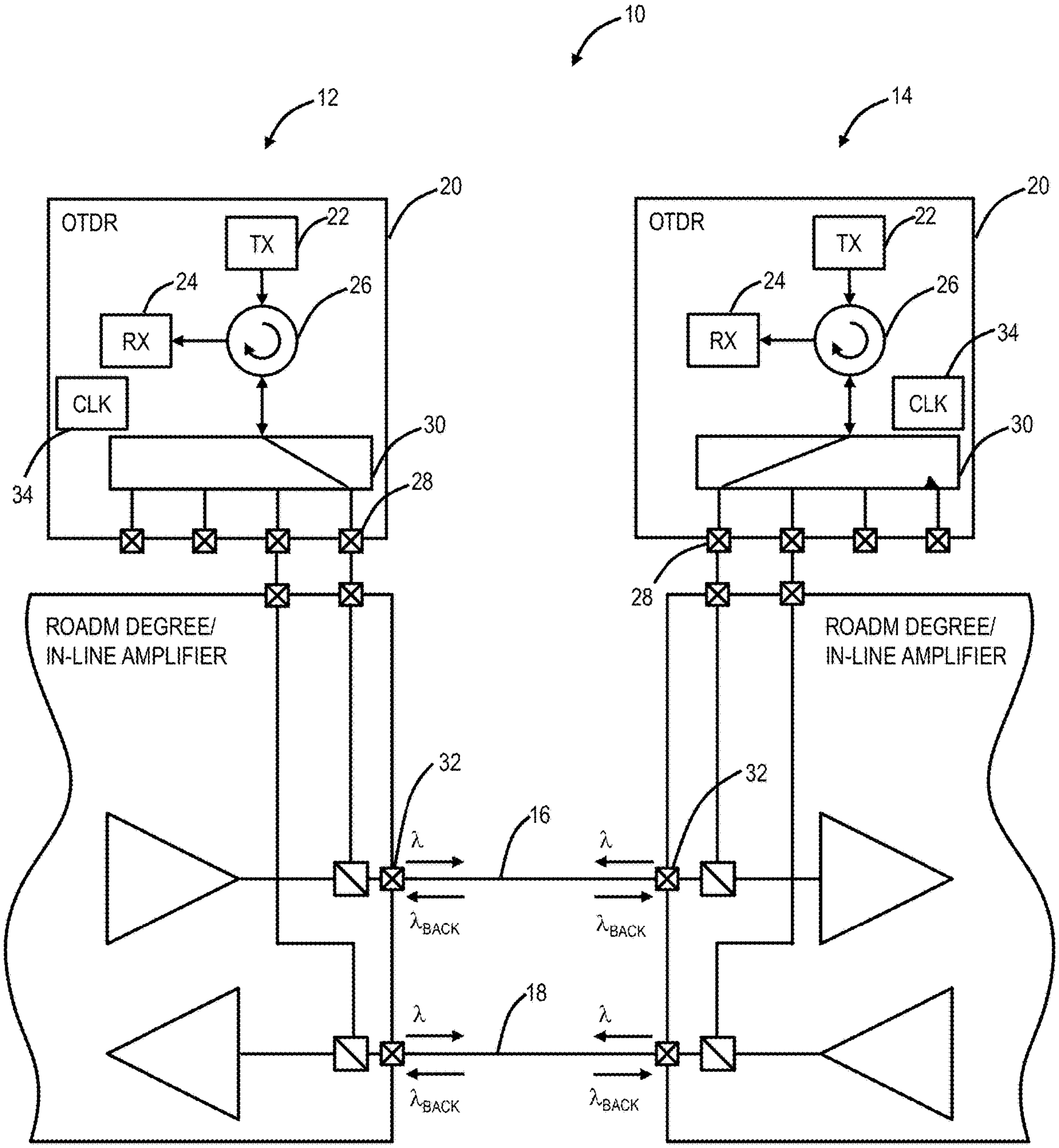
FIG. 1 is a diagram of an example embedded bidirectional OTDR system for illustrating bidirectional OTDR measurements in an optical line system, between two network elements.

Again, the present disclosure relates to systems and methods for a bidirectional OTDR using a single wavelength. The bidirectional OTDR is embedded or integrated into an optical networking system, i.e., at an optical network element, WDM terminal, ROADM, in-line amplifier, etc., and the objective is to use the bidirectional OTDR in-service meaning while there is traffic on traffic-carrying wavelengths over a fiber under test. U.S. Pat. No. 10,277,311, incorporated above, describes an approach where the embedded OTDR uses different wavelengths for each direction of the OTDR as well as the different wavelengths being outside of a signal band where traffic-carrying wavelengths operate, allowing a bidirectional OTDR measurement, in-service, with both ends being tested at the same time. Having two different wavelengths increases cost, number of components (laser sources, filters, etc.), power, size, etc. Also, having two different wavelengths may not be as accurate, e.g., different wavelengths may show different OTDR events or characterize a same event differently based on the wavelength differences, leading to inconsistent results.

A single wavelength is desirable for any embedded OTDR equipment, having less cost, components, power, size, etc. and more accurate results. That said, the bidirectional is problematic for the same wavelength being sent in opposite directions at the same time, i.e., collisions in the OTDR pulses leading to inaccurate results. One solution is to coordinate the measurement, such as via some handshaking procedure, e.g., first end goes first and then the second end goes. However, this is complex for coordination, takes about twice the time as a single measurement, etc. There is a need to perform an OTDR measurement fast as often it is used before turning on amplifiers (e.g., Raman) and this may occur during a fiber recovery.

Accordingly, the bidirectional OTDR described herein uses a single wavelength and can operate from both directions at the same time, without collisions, and in-service with the traffic-carrying wavelengths on the fiber under test. Specifically, the bidirectional OTDR supports simultaneous operation, meaning both ends can perform an OTDR measurement at the same time using the same wavelength on the same fiber under test, without coordination with one another. Of note, simultaneous does not necessarily mean the two OTDR modules operate exactly at the same start and end time, but rather that they generally perform measurements at the same time. This is performed by selecting OTDR pulse repetition rates to minimize any impact of interfering pulses in an averaged OTDR trace. That is, an OTDR measurement includes multiple tests using OTDR pulses and the multiple tests are averaged to provide accurate results, faster due to the simultaneous operation, and with less complex hardware. The OTDR pulse repetition rates are out-of-phase between the two ends, so that any interference is minimized due to the averaging of results.

Embedded Bidirectional OTDR System

FIG. 1 is a diagram of an example embedded bidirectional OTDR system 10 for illustrating bidirectional OTDR measurements in an optical line system, between two network elements 12, 14. For illustration purposes, only relevant portions of the network elements 12, 14 are shown and those skilled in the art understand there are various other components for realizing connectivity in the optical line system, e.g., modems, Wavelength Selective Switches, filters, etc. Also, the network elements 12, 14 are presented as one implementation for realizing bidirectional OTDR measurements with the same wavelength and those skilled in the art will recognize any physical implementation are contemplated using the techniques described herein, including applications beyond optical networking.

The network elements 12, 14 can each either be a ROADM or an intermediate line amplifier site. That is, typical optical networks include ROADM nodes which include degrees that can add/drop wavelengths as well as route wavelength from other degrees, as well as in-line amplifier sites which have input fibers and output fibers with amplifiers to optically amplifying the wavelengths traversing the site. For the purposes of the embedded bidirectional OTDR system 10, a measurement is between two adjacent network elements 12, 14 and they can be a ROADM or an in-line amplifier. Specifically, a measurement on either fiber 16, 18. Typically, the network elements 12, 14 connect to one another over a fiber pair including the fibers 16, 18 where one fiber 16 is used to transmit from the network element 12 to the network element 14 while the other fiber 18 is used to transmit from the network element 14 to the network element 12, i.e., unidirectional transmission of the traffic-carrying wavelengths. Of course, other embodiments are contemplated including a single fiber where the network elements 12, 14 communicate to one another with the traffic-carrying wavelengths both co-propagating and counter-propagating on the same fiber.

The embedded bidirectional OTDR system 10 includes an OTDR module 20, located at each of the network elements 12, 14. The OTDR module 10 includes a transmitter 22 configured to provide OTDR pulses at a wavelength λ, a receiver 24, and a circulator 26 or other three port optical connectivity device connecting both the transmitter 22 and the receiver 24 to a port 28 that ultimately connects the OTDR module 20 to the fiber 16, 18 under test. The OTDR module 20 can be integrated with some component in the network elements 12, 14 or a plug or the like configured to operate with the network element 12, 14. Collectively, the OTDR modules 20 at both the network elements 12, 14 are configured to support bidirectional OTDR measurements, in-service, and both using the same wavelength λ. The wavelength λ can be select to not interfere with any traffic-carrying wavelengths, such as outside of the Erbium Doped Fiber Amplifier (EDFA) amplification band and greater than WDM signals which are typical between 1530 nm and 1565 nm (i.e., the EDFA amplification band). As an example, the wavelength λ, can be 1625 nm, 1527 nm, or the like.

The OTDR module 20 includes the optical circulator 26 or other three-port optical connectivity device. One advantage of the optical circulator 26 is that it enables a single fiber port 28 to connect to the OTDR module 20, thereby eliminating cabling errors and reducing complexity. The transmitter 22 connects to the optical circulator 26 to transmit OTDR pulses on the fiber 16, 18, and the receiver 24 connects to the optical circulator 26 to receive the backscatter signal from the OTDR pulses. A third port of the optical circulator 26 can connect to an optical switch 30, as well as directly to a port 32 connected to the fiber 16.

The optical switch 30 allows the OTDR module 20 to time-share between different fibers 16, 18. That is, wherever the optical switch 30 is connected, the associated fiber 16, 18 can be tested. In this example, the optical switch 30 is a 1×4 optical switch with one port permanently coupled to the optical circulator 26 and the other four ports 28 selectively coupled to associated fibers. For example, at an in-line amplifier, the optical switch 30 could connect to any of four connected fibers, at a ROADM, to two degrees, etc.

Example Bidirectional OTDR Traces

Figure 2:
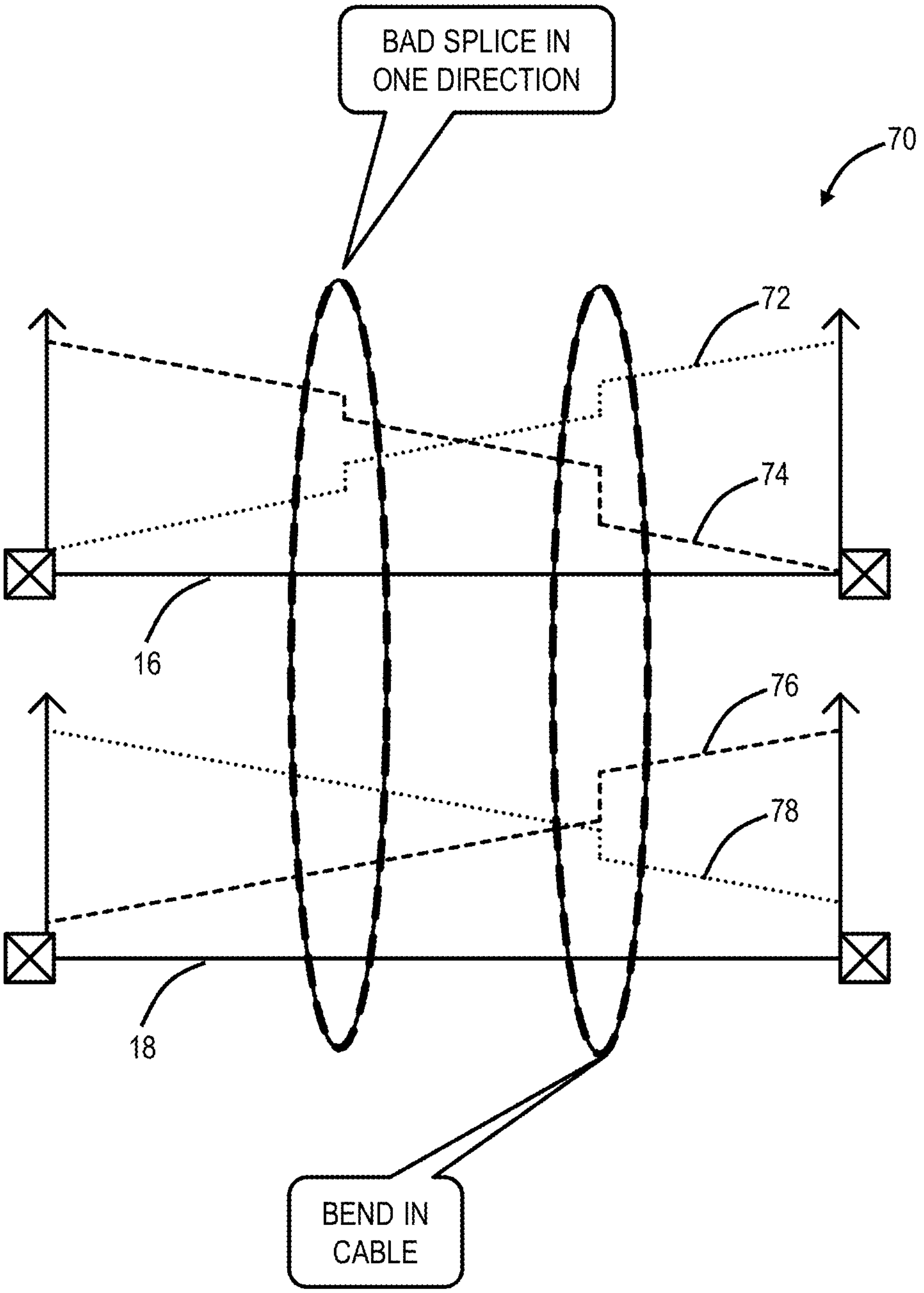
FIG. 2 is a graph of example OTDR traces on a fiber under test.
Figure 3:
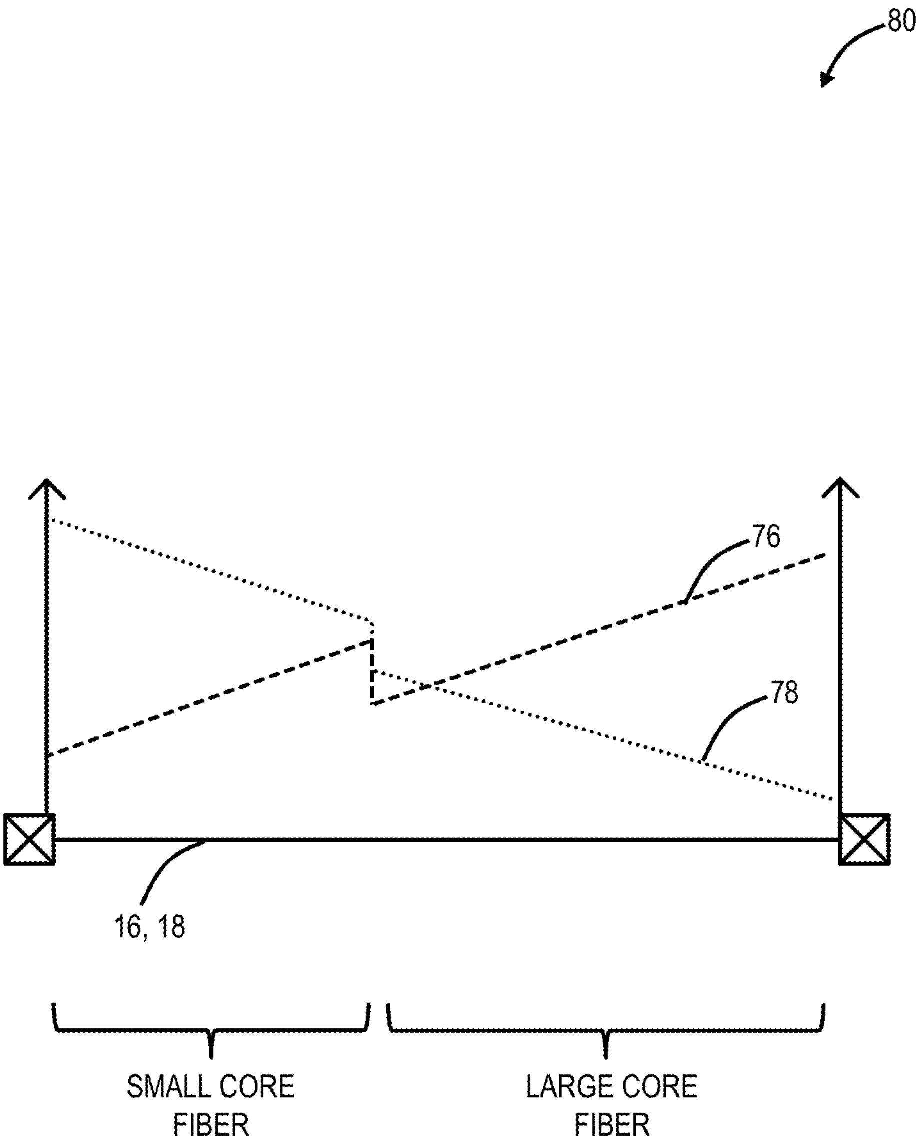
FIG. 3 is a graph of an OTDR trace on a fiber under test illustrating differentiation of different fiber types.

FIG. 2 is a graph of example OTDR traces 70 on a fiber 16, 18 under test. FIG. 3 is a graph of an OTDR trace 80 on a fiber 16, 18 under test illustrating differentiation of different fiber types. Once the OTDR traces are acquired at each OTDR module 20, in each of the network elements 12, 14, the trace data can be exchanged between the network elements 12, 14, between one another or to a higher-level management system, via an Optical Service Channel (OSC), a Data Communications Network (DCN), or the like so that composite traces can be created by combining the traces collected from both ends of the fiber 16, 18.

Advantageously, the bidirectional OTDR data enables better differentiation and event detection than a single, unidirectional OTDR trace. In FIG. 2, the OTDR traces 70 are on the two fibers 16, 18, including traces 72, 74, 76, 78. With the bidirectional OTDR data, a bad splice in one direction can be differentiated from a bend in the entire cable. Here, the bad splice only shows up on the fiber 16 whereas the bend in the entire cable shows up on both the fibers 16, 18. In FIG. 3, the bidirectional OTDR data allows a user to distinguish between a change in fiber type and a lossy splice. In a unidirectional OTDR trace, both a change in fiber type and a lossy splice have a similar signature. In the case of a bidirectional OTDR, similar splice loss will be observed in both directions, whereas a change in fiber type will appear as a loss in one direction (going from smaller core to larger core fiber) but as a gain in the other (going from larger to smaller core).

Single Wavelength, Bidirectional OTDR

The objective of the present disclosure is to eliminate this complexity and associated delays, by allowing two OTDR modules 20 to operate at the same wavelength in the same fiber 16, 18 at the same time without impacting the quality of the OTDR traces.

The OTDR modules 20 are each configured to perform OTDR measurements which generally include transmitting a series of pulses, each pulse have a given width and there being a period between successive pulses, via the transmitter 22, and observing the reflected and backscattered signals from the series of pulses via the receiver 24. The problem with using same wavelength for the OTDR modules 20 for bidirectional and simultaneous measurements include collisions.

Figure 4:
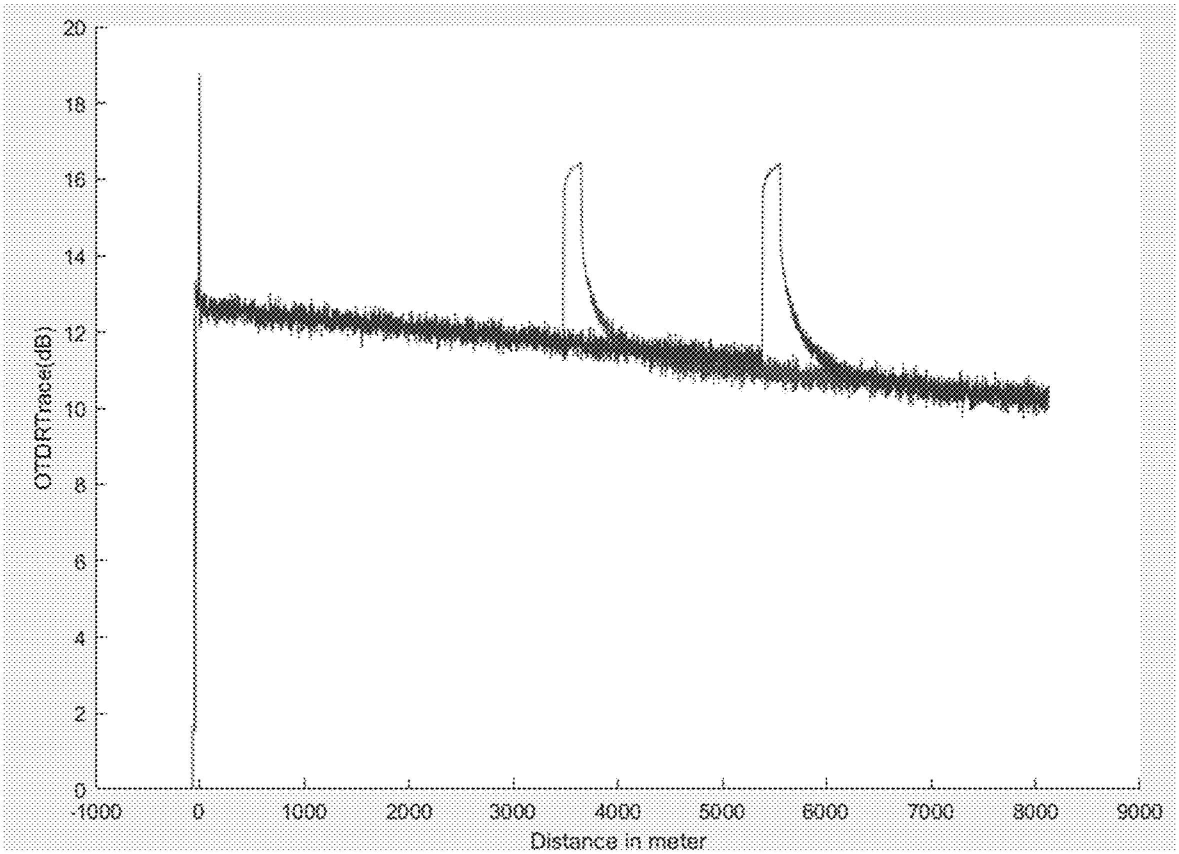
FIG. 4 is a graph of OTDR traces having false events that can be caused by OTDR collisions when two OTDR modules operate simultaneously in the same fiber.

FIG. 4 is a graph of OTDR traces having false events that can be caused by OTDR collisions when two OTDR modules 20 operate simultaneously in the same fiber. When the OTDR pulse collision occurs, the OTDR receiver 24 sees a combination of the reflected OTDR signals from its own transmitter 22 pulse and the interfering OTDR pulse from the transmitter at the other end of fiber. The impact of the interfering pulses depends on the synchronization of the two OTDR modules 20, which typically have very similar pulse rates, but different phase. Where a false event shows up in the OTDR trace depends on the time difference between the two OTDR Tx pulse trains. Since the two OTDR modules 20 are independent, the time difference between them is random, and the false event can show up at any location in the OTDR trace.

To reduce the noise, the actual OTDR trace is usually obtained by averaging several OTDR scans, rather than just one scan, e.g., thousands. To achieve this, the transmitter 22 sends out thousands of pulses with a certain repetition rate, and the OTDR receiver 24 samples the backscattered waveform thousands of times, and averages the results to calculate the final OTDR trace. For example, the OTDR pulse repetition rate can be provisioned at fixed value for a given OTDR type (e.g., around 750 Hz for Office Trace type). The variation in clock rate of a clock 34 for different OTDR modules 20 can be small, so with same rate setting the actual OTDR pulse rate difference between two ends is less than a few parts per million (ppm). Because the pulse rates of the two OTDR modules 20 are so similar, the relative phase of the interfering pulses can be largely maintained over 1000's of pulses so that the false events can show up even after averaging. The width of a false event depends on the clock rate difference between the two ends: the smaller the difference, the slower the false event location moves over thousands of scan samples, the wider the false event appears in final trace.

Figure 5:
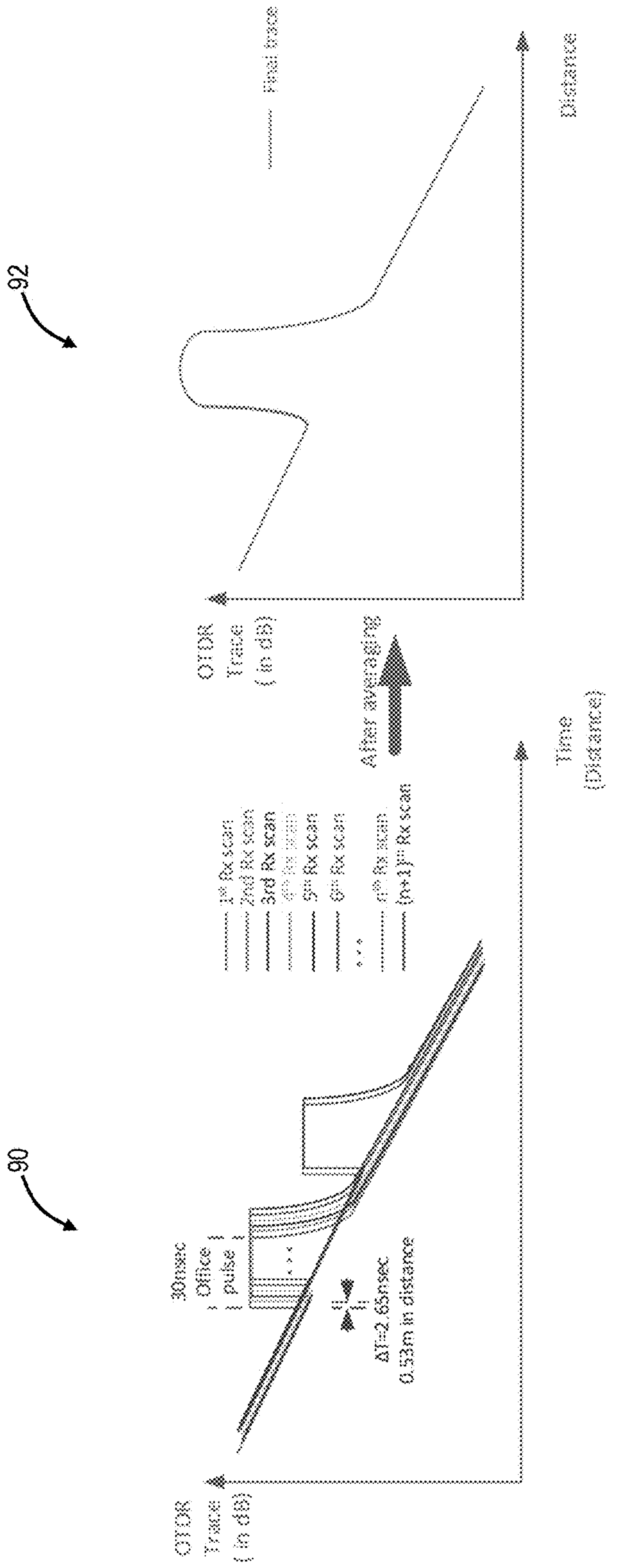
FIG. 5 is a graph illustrating OTDR trace averaging and how a final OTDR trace is affected by a collision.

FIG. 5 is a graph illustrating OTDR trace averaging and how a final OTDR trace is affected by a collision. A first graph 90 shows what the OTDR receiver 24 sees on each of multiple OTDR pulses (thousands), and a second graph 92 is the final OTDR trace interpreted by OTDR Rx after thousands of averaging. In this example, assume the transmitter 22 is sending pulses for an office trace with a pulse width of 30 ns and the clock 34 difference between the OTDR modules 20 transmitting from each end is 2 ppm. Due to the clock difference 34, the false event, which is caused by pulse collision, moves ~0.53 m (2.65 ns=1.32611 ms×2.0E−6 (2 ppm)) with each scan. In the final trace, this movement causes averaging which results in the false event shown in the graph 92.

We did a number of experiments to evaluate the impact of OTDR collisions. We configured the OTDR modules 20 to purposely have collisions occurring all the time, collected the OTDR traces in various combinations of trace types, which are provisioned with different combinations of pulse duration (30 ns, 1 us, 20 us, etc.), detection distance range (8 km, 32 km and 256 km) and repetition rate. As expected, there are many cases where the OTDR collision produces false events in the OTDR trace, because even though the two OTDR's are not synchronized, they have clock 34 frequencies that are either closely matched, or that produce periodic phase matching. As is described herein, the present disclosure includes different clock 34 frequencies between the OTDR modules 20 for purposes of mitigating collisions in the final OTDR trace.

The results are summarized in the following table.

| | | OTDR type on NE 14 | | |
|---|---|---|---|---|
| | | Office | Short | Long |
| OTDR type on NE 12 | Office | #1 probability of false events = 6% | #2 | #3 |
| | Short | #4 No false events detected | #5 Probability of false events = 24% | #6 |
| | Long | #7 multiple false events seen within the same trace. | #8 | #9 probability of false events = 95% |

For example, in the case of collision between two Office Traces, the fiber distance being sampled in the OTDR trace is 8 km (~80 us sampling window), and the pulse repetition rate is 754 Hz (1.326 ms period, which corresponds to ~132 km distance). The probability of interfering pulses from the far end OTDR arriving within the 80 us sampling window and causing false events is 80 us/1.326 ms=6%. For Short OTDR traces, the sampling window is 32 km/320 us, and the pulse period is 1.342 ms, so the probability of seeing false events is 320 us/1.342 ms=24% when short OTDR collisions happen. Long OTDR traces have 2.56 ms sampling window and 2.702 ms pulse period, so the probability of seeing OTDR collision false events is 2.56/2.702=95% when Long OTDR collisions happen. In some cases when collisions occur between different OTDR types (with different OTDR pulse rates), we saw clean OTDR traces after averaging, such as case #3 and #6 the above table.

With the insight of case #3 and #6 behavior, the present disclosure provides a better solution to mitigate impact of the OTDR collisions.

OTDR Pulse Collision Mitigation

By carefully selecting the clocks 34 on two ends of the fiber under test 16, 18, we can make sure that the OTDR clocks 34 are not synchronized for the 9 combinations of OTDR collision cases, in the above table, therefore, even though the collision happens, on receiver 24 side the interfering pulses are spread across the sampling window, so that the impact on the final OTDR trace becomes negligible after averaging.

For example, if N is the number of averages in the OTDR trace, selecting pulse periods $P_A$ and $P_B$ with $P_B=P_A+P_A/N$ will ensure that interfering pulses all arrive at different times spread evenly across the nominal pulse period. Specifically, pulse periods $P_A$ and $P_B$ refer to the repetition rate of ODTR pulses from the transmitter 22 at each of the network elements 12, 14, e.g., the pulse periods $P_A$ can be the network element 12's repetition rate, and the pulse period $P_B$ can be the network element 14's repetition rate. The clock 34 can include circuitry that keeps time and that drives the transmitter 22 for transmitting pulses at a given repetition rate based on the time. In an embodiment, the clocks 34 can be synchronized, e.g., with 2 ppm as described above, and they can select different pulse periods $P_A$ and $P_B$. In another embodiment, the clocks 34 may be purposefully not synchronized with one another to support the different pulse periods $P_A$ and $P_B$. The key objective is having the two ends not synchronized so the interfering pulses are spread across the sampling window. Those skilled in the art will recognize any implementation is contemplated to support this functionality.

The key is to select or configure pulse periods $P_A$ and $P_B$ relative to one another so that the interfering pulses move locations between individual OTDR traces rather than all land together in a bunch, i.e., where they combine in averaging to cause a fake event in the final OTDR trace. In this manner, an interfering pulse on various individual traces would be averaged out and not show up as a fake event on the final OTDR trace.

Figure 6:
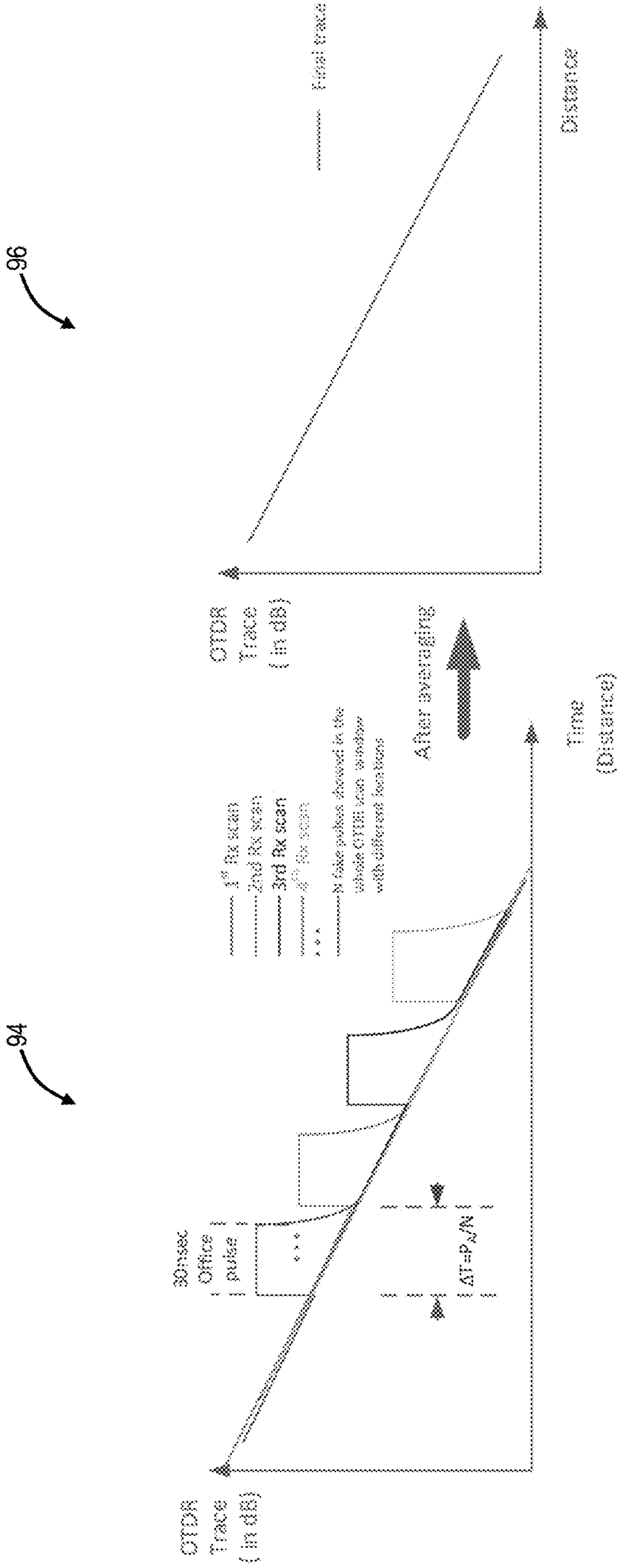
FIG. 6 is a graph illustrating OTDR trace averaging and how a final OTDR trace removes any false events due to collisions using the non-synchronous pulse periods.

FIG. 6 is a graph illustrating OTDR trace averaging and how a final OTDR trace removes any false events due to collisions using the non-synchronous pulse periods. A first graph 94 shows what the OTDR receiver 24 sees on each of multiple OTDR pulses (thousands), and a second graph 96 is the final OTDR trace interpreted by OTDR Rx after thousands of averaging. Key here, compared to FIG. 5, the out-of-sync pulse periods mean the fake pulses are distributed at different locations on each OTDR measurement. Thus, when the final OTDR trace is created in the graph 96, by averaging all of the measurements, the single fake pulse is smoothed out and no "fake" events are shown in the final OTDR trace. Again, in FIG. 5, because the two OTDR modules 20 have the same wavelength, the same pulse period (or even some multiples that interact), and a clock that is generally within 2 ppm of one another, the fake pulses bunch up and when averaged, create a fake event. Now, by having the pulse periods out-of-sync, there are still fake pulses, but they are distributed across the fiber (distance) and are removed due to the averaging. For example, one fake pulse per OTDR measurement, each being at a different location, averaging thousands of OTDR measurements, with a fake pulse on only one of the thousands of OTDR measurements is removed almost entirely due to the averaging, such as shown in FIG. 6 in the graph 96.

For example, in an embodiment, $P_A$=1.326372 ms, $P_B$=1.326872 ms, N=2653, we would not see fake event on final OTDR trace. This is a small difference in pulse period, namely 0.0005 ms, i.e., a very small value, but it causes the interfering pulses to distribute along the fiber. Of course, other choices of pulse periods are possible and contemplated herein, i.e., any approach to ensure the pulses between the OTDR modules 20 at the same wavelength do not interfere at the same locations causing fake events. It is important to avoid combinations of frequencies that cause repeating patterns, which occur if $i*P_A=j*P_B$, where i and j are integers that are small compared to N. For example, if there is 2000 traces for averaging, i=1, j=2; there will be 1000 traces on the first OTDR Rx having the fake events at the same location X and the same location Y, assuming the two OTDR modules 20 have the assuming the OTDR module 20 on network element 12 has $P_A$, and the OTDR module 20 on the network element 14 has $P_B$. The distance between location X and Y is the half of the OTDR scan window. In that case, we will see two fake events on the final OTDR trace.

Assigning Pulse Periods

In operation, there are two OTDR modules 20, let's label them OTDR modules 20A, 20B, with the OTDR 20A having the $P_A$ pulse period, and the OTDR 20B having the $P_B$ pulse period. The key with a bidirectional OTDR measurement with each of the OTDR modules 20A, 20B is that their pulse periods $P_A$ and $P_B$ are not synchronized. There can be different approaches for the card (the OTDR modules 20A, 20B) or system software to automatically assign the $P_A$ and $P_B$ pulse periods in order to avoid collisions. Of course, the values can be manually configured as well.

A first approach can be based on assigning the pulse period based on the type of port that the bidirectional OTDR module 20 is configured to at a local node. For example, the OTDR module 20 and its transmitter 22 can either be co-propagating the OTDR pulses with traffic-carrying wavelengths or counter-propagating. That is, the OTDR module 20 will know based on the system configuration if it is co-propagating or counter-propagating. In this approach, the pulse period can be based thereon, so that there are different values whether the OTDR module 20 is co-propagating or counter-propagating. This can be a simple lookup table.

For example, there can be two sets of OTDR clocks 34 for office/short/long for co-propagating or counter-propagating ports respectively, so that OTDR module 20 just needs to provision the OTDR clock 34 from a lookup table based on OTDR launch port and trace type. With this OTDR clock 34 pair provisioned at both ends, the OTDR traces are not affected by collisions and therefore the two OTDR modules 20 can operate independently without any coordination/handshaking required. We used this approach and verified that there we no false events due to collisions in any of the 9 cases listed in the table above. This approach has the advantage that decisions on pulse period assignment can be made locally, which is simpler.

Figure 7:
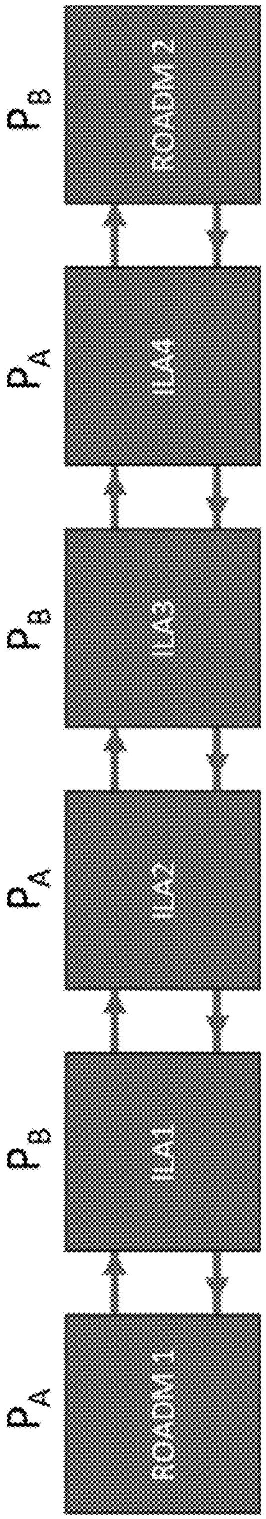
FIGS. 7 and 8 are network diagrams illustrating an optical section between two ROADMs (ROADM1, ROADM2) and four intermediate line amplifier (ILA) sites (ILA1, ILA2, ILA3, ILA4) for describing pulse period assignments.
Figure 8:
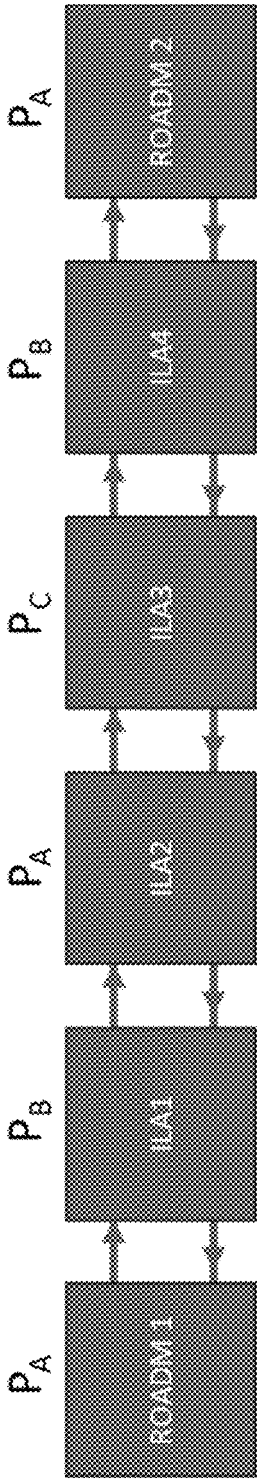

A second approach involves assigning a specific pulse period to each network element 12, 14 in the system, so that the pulse period of a given network element is different than the pulse period of the adjacent network elements. FIGS. 7 and 8 are network diagrams illustrating an optical section between two ROADMs (ROADM1, ROADM2) and four intermediate line amplifier (ILA) sites (ILA1, ILA2, ILA3, ILA4) for describing pulse period assignments. As is known in the art, in an optical network, an optical section (Optical Multiplex Section (OMS)) is a section of the network between two ROADM nodes with zero or more ILA sites. In FIG. 7, odd nodes are assigned frequency $P_A$ and even nodes are assigned $P_B$, so that adjacent nodes always have different pulse periods. This requires global coordination of all the nodes in the ROADM section by the system software to decide which nodes are designated odd and which ones are designated even.

FIG. 8 shows a different type of pulse period assignment for the same ROADM section, in which case the pulse period assignment starts from each end of the ROADM section with both ROADM sites being assigned the same pulse period $P_A$. During system turn-up, each ROADM would communicate with the ILA adjacent to it (ILA1 for ROADM1 and ILA4 for ROADM2) and have it use alternate period $P_B$. ILA1 would then communicate with ILA2 and have it use $P_A$ and IL4 would do the same with ILA3. ILA2 and ILA3 would then communicate with each other and detect that both have been assigned the same period $P_A$. To resolve this one of the 2 ILA's would then change its period to a 3rd value Pc, different from $P_A$ and $P_B$. This scheme only requires communications between adjacent nodes instead of global coordination as in FIG. 7, which could be simpler to implement in some cases.

OTDR Module and Process

In an embodiment, an OTDR includes a transmitter configured to transmit first OTDR pulses, at a first pulse period and at a wavelength λ, over a fiber under test; a receiver configured to receive signals from the fiber under test; and circuitry configured to set the first pulse period and to average measurements resulting from the received signals due to the first OTDR pulses, wherein the OTDR is configured to operate with a second OTDR at another end of the fiber under test for a bidirectional OTDR measurement, wherein the second OTDR uses the same wavelength λ and transmits second OTDR pulses at a second pulse period, different from the first pulse period. The OTDR can be one of integrated in a module in an optical network element and a pluggable module configured to operate in the optical network element, such that the OTDR is an embedded OTDR.

The wavelength λ can be outside of a range of wavelengths used for traffic-carrying channels in an optical line system. The first pulse period and the second pulse period can be selected so that any interfering second OTDR pulses are spread across the first pulse period and are minimized in the average results. The OTDR can include a clock utilized by the transmitter for the first pulse period, wherein the clock is within a tolerance of a second clock at the second OTDR. The first pulse period can be selected without coordination with the second OTDR. The first pulse period can be selected based on whether the transmitter is configured to transmit the first OTDR pulses co-propagating or counter-propagating with traffic-carrying wavelengths. The first pulse period and the second pulse period can be assigned based on a global assignment that ensures adjacent nodes have different pulse periods. The first pulse period and the second pulse period can be assigned based on connectivity to adjacent nodes. The first pulse period and the second pulse period can be assigned based on a pulse width of the first and second OTDR pulses and based on a distance of the bidirectional OTDR measurement.

Figure 9:
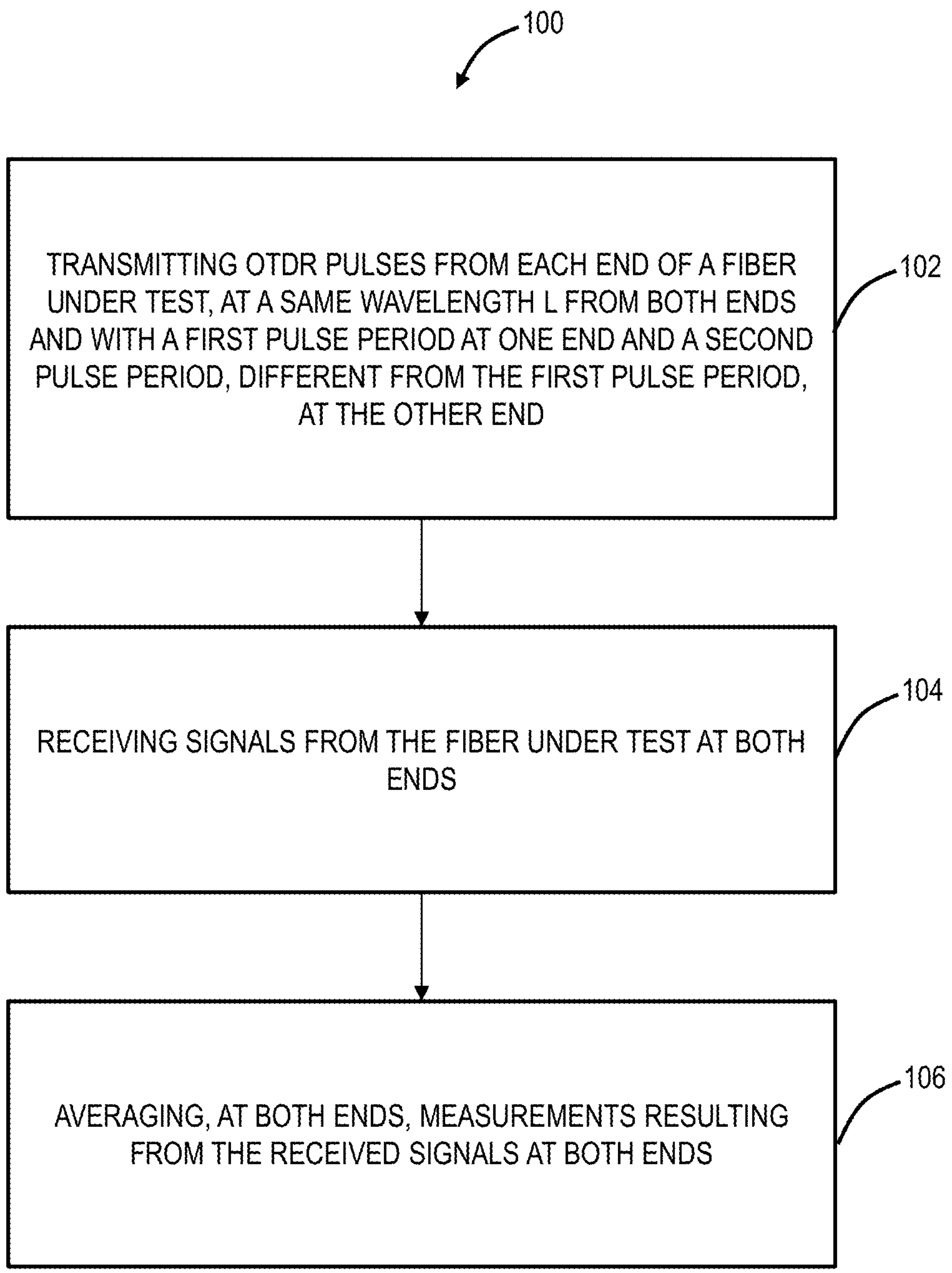
FIG. 9 is a flowchart of a bidirectional Optical Time Domain Reflectometer (OTDR) process.

FIG. 9 is a flowchart of a bidirectional Optical Time Domain Reflectometer (OTDR) process 100. The process 100 includes transmitting OTDR pulses from each end of a fiber under test, at a same wavelength λ from both ends and with a first pulse period at one end and a second pulse period, different from the first pulse period, at the other end (step 102); receiving signals from the fiber under test at both ends (step 104); averaging, at both ends, measurements resulting from the received signals at both ends (step 106). The transmitting and the receiving can be performed by one of a module integrated in an optical network element and a pluggable module configured to operate in the optical network element, for an embedded OTDR.

The wavelength λ can be outside of a range of wavelengths used for traffic-carrying channels in an optical line system. The first pulse period and the second pulse period can be selected so that any interfering OTDR pulses are spread across the first pulse period and are minimized in the average results. For example, if p1=1.000 ms, p2-1.001 ms and the number of pulses being averaged is 1000, then as the number of pulses grows from 1 to 1000, the relative delay between the 2 OTDR's will vary from 0.001 ms to 1 ms in steps of 0.001 ms, which will "spread" the interfering pulses evenly across the pulse period of the first OTDR.

The process 100 can include operating a clock at each end, wherein the clock at each end is within a tolerance of one another. The process 100 can include selecting the first pulse period and the second pulse period without coordination between the two ends. The process 100 can include selecting the first pulse period and the second pulse period based on whether the transmitted OTDR pulses are co-propagating or counter-propagating with traffic-carrying wavelengths.

The process 100 can include performing a global assignment of the first pulse period and the second pulse period that ensures adjacent nodes have different pulse periods. The process 100 can include performing an assignment of the first pulse period and the second pulse period based on connectivity to adjacent nodes. The process 100 can include assigning the first pulse period and the second pulse period based on a pulse width of the OTDR pulses and based on a distance of a measurement of the bidirectional OTDR.

In a further embodiment, an apparatus includes circuitry configured to cause transmission of first Optical Time Domain Reflectometer (OTDR) pulses at a first pulse period and at a wavelength λ, over a fiber under test, and, responsive to received signals due to the first OTDR pulses from the fiber under test; average measurements resulting from the received signals, wherein the first OTDR pulses are configured to operate with a second OTDR at another end of the fiber under test for a bidirectional OTDR measurement, wherein the second OTDR uses the same wavelength λ and transmits second OTDR pulses at a second pulse period, different from the first pulse period.

The circuitry can be one of integrated in a module in an optical network element and a pluggable module configured to operate in the optical network element, as an embedded OTDR. The wavelength λ can be outside of a range of wavelengths used for traffic-carrying channels in an optical line system. The first pulse period and the second pulse period can be selected so that any interfering second OTDR pulses are spread across the first pulse period. The apparatus can further include a clock utilized for the first pulse period, wherein the clock is within a tolerance of a second clock at the second OTDR.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. An Optical Time Domain Reflectometer (OTDR) comprising:

a transmitter configured to transmit first OTDR pulses, at a first pulse period and at a wavelength λ, over a fiber under test;

a receiver configured to receive signals from the fiber under test; and circuitry configured to set the first pulse period and to average measurements resulting from the received signals, wherein the OTDR is configured to operate with a second OTDR at another end of the fiber under test for a bidirectional OTDR measurement, wherein the second OTDR uses the same wavelength λ and transmits second OTDR pulses at a second pulse period, different from the first pulse period, wherein the first pulse period and the second pulse period are selected such that, during simultaneous operation of the OTDR and the second OTDR on the fiber under test using the same wavelength λ, interfering ones of the second OTDR pulses occur at different locations in successive OTDR measurements that are averaged, such that false events due to OTDR pulse collisions are reduced in a final averaged OTDR trace.

2. The OTDR of claim 1, wherein the OTDR is one of integrated in a module in an optical network element and a pluggable module configured to operate in the optical network element, such that the OTDR is an embedded OTDR.

3. The OTDR of claim 1, wherein the wavelength λ is outside of a range of wavelengths used for traffic-carrying channels in an optical line system.

4. The OTDR of claim 1, wherein the first pulse period and the second pulse period are selected so that any interfering second OTDR pulses are spread across the first pulse period.

5. The OTDR of claim 1, further comprising a clock utilized by the transmitter for the first pulse period, wherein the clock is within a tolerance of a second clock at the second OTDR.

6. The OTDR of claim 1, wherein the first pulse period is selected without coordination with the second OTDR.

7. The OTDR of claim 1, wherein the first pulse period is selected based on whether the transmitter is configured to transmit the first OTDR pulses co-propagating or counter-propagating with traffic-carrying wavelengths.

8. The OTDR of claim 1, wherein the first pulse period and the second pulse period are assigned based on a global assignment that ensures adjacent nodes have different pulse periods.

9. The OTDR of claim 1, wherein the first pulse period and the second pulse period are assigned based on connectivity to adjacent nodes.

10. The OTDR of claim 1, wherein the first pulse period and the second pulse period are assigned based on a pulse width of the first and second OTDR pulses and based on a distance of the bidirectional OTDR measurement.

11. A bidirectional Optical Time Domain Reflectometer (OTDR) method comprising steps of:

transmitting OTDR pulses from each end of a fiber under test, at a same wavelength λ from both ends and with a first pulse period at one end and a second pulse period, different from the first pulse period, at the other end;

receiving signals from the fiber under test at both ends; and averaging, at both ends, measurements resulting from the received signals at both ends, wherein the first pulse period and the second pulse period are selected such that, during simultaneous operation of the OTDR and the second OTDR on the fiber under test using the same wavelength λ, interfering ones of the second OTDR pulses occur at different locations in successive OTDR measurements that are averaged, such that false events due to OTDR pulse collisions are reduced in a final averaged OTDR trace.

12. The bidirectional OTDR method of claim 11, wherein the transmitting and the receiving are performed by one of a module integrated in an optical network element and a pluggable module configured to operate in the optical network element, for an embedded OTDR.

13. The bidirectional OTDR method of claim 11, wherein the wavelength λ is outside of a range of wavelengths used for traffic-carrying channels in an optical line system.

14. The bidirectional OTDR method of claim 11, wherein the first pulse period and the second pulse period are selected so that any interfering OTDR pulses are spread across the first pulse period.

15. The bidirectional OTDR method of claim 11, wherein the steps further include operating a clock at each end, wherein the clock at each end is within a tolerance of one another.

16. An apparatus comprising circuitry configured to:

cause transmission of first Optical Time Domain Reflectometer (OTDR) pulses at a first pulse period and at a wavelength λ, over a fiber under test, and responsive to received signals from the fiber under test, average measurements resulting from the received signals, wherein the first OTDR pulses are configured to operate with a second OTDR at another end of the fiber under test for a bidirectional OTDR measurement, wherein the second OTDR uses the same wavelength λ and transmits second OTDR pulses at a second pulse period, different from the first pulse period, wherein the first pulse period and the second pulse period are selected such that, during simultaneous operation of the OTDR and the second OTDR on the fiber under test using the same wavelength λ, interfering ones of the second OTDR pulses occur at different locations in successive OTDR measurements that are averaged, such that false events due to OTDR pulse collisions are reduced in a final averaged OTDR trace.

17. The apparatus of claim 16, wherein the circuitry is one of integrated in a module in an optical network element and a pluggable module configured to operate in the optical network element, as an embedded OTDR.

18. The apparatus of claim 16, wherein the wavelength λ is outside of a range of wavelengths used for traffic-carrying channels in an optical line system.

19. The apparatus of claim 16, wherein the first pulse period and the second pulse period are selected so that any interfering second OTDR pulses are spread across the first pulse period.

20. The apparatus of claim 16, further comprising a clock utilized for the first pulse period, wherein the clock is within a tolerance of a second clock at the second OTDR.

* * * * *